(12) United States Patent
Yasuda et al.

(10) Patent No.: US 6,689,233 B2
(45) Date of Patent: Feb. 10, 2004

(54) HYDROGEN ABSORBING ALLOY AND METHOD FOR ITS PRODUCTION

(75) Inventors: Kiyotaka Yasuda, Hiroshima (JP); Daisuke Mukai, Hiroshima (JP); Minoru Sakai, Hiroshima (JP); Shigeo Hirayama, Hiroshima (JP); Kazuhito Komatsu, Hiroshima (JP); Shinya Kagei, Hiroshima (JP)

(73) Assignee: Mitsui Mining & Smelting Company Ltd., Tokyo (JP)

( * ) Notice: Subject to any disclaimer, the term of this patent is extended or adjusted under 35 U.S.C. 154(b) by 86 days.

(21) Appl. No.: 10/009,258

(22) PCT Filed: Apr. 10, 2001

(86) PCT No.: PCT/JP01/03083

§ 371 (c)(1),
(2), (4) Date: Dec. 10, 2001

(87) PCT Pub. No.: WO01/77397

PCT Pub. Date: Oct. 18, 2001

(65) Prior Publication Data

US 2003/0047254 A1 Mar. 13, 2003

(30) Foreign Application Priority Data

Apr. 10, 2000 (JP) ........................................ 2000-107812

(51) Int. Cl.$^7$ ............................ B22D 11/06; H01M 4/04
(52) U.S. Cl. ........................ 148/555; 148/429; 164/480; 420/900; 420/455
(58) Field of Search ................................ 148/403, 561; 420/900; 164/423, 428, 463, 480

(56) References Cited

U.S. PATENT DOCUMENTS

| 5,520,243 A | * | 5/1996 | Freeman et al. ............ 164/428 |
| 5,688,341 A | * | 11/1997 | Isono et al. ................. 148/505 |
| 6,268,084 B1 | * | 7/2001 | Hayashida et al. ...... 429/218.2 |
| 2003/0096164 A1 | * | 5/2003 | Sakai et al. ................. 429/206 |
| 2003/0129494 A1 | * | 7/2003 | Kaneda et al. ........... 429/231.1 |

FOREIGN PATENT DOCUMENTS

| JP | 7-54016 | 2/1995 |
| JP | A 7-99055 | 4/1995 |
| JP | 7-320729 | 12/1995 |
| JP | 8-60265 | 3/1996 |
| JP | A 9-213319 | 8/1997 |
| JP | A 11-96999 | 4/1999 |
| JP | A 11-152533 | 6/1999 |
| JP | 2000-144278 | 5/2000 |
| JP | A 2000-234133 | 8/2000 |

* cited by examiner

Primary Examiner—George Wyszomierski
(74) Attorney, Agent, or Firm—Young & Thompson

(57) ABSTRACT

A hydrogen storage material which is characterized by having, as a cast alloy, a flaky or similar shape with a thickness of 50 to 500 $\mu$m and showing such crystallite orientation that the X-ray diffraction pattern has an intensity ratio of plane indices (002)/(200) of 2 to 10 as measured with the cooled surface of the flaky cast alloy being in parallel with a mount, and a process of producing the same.

4 Claims, 4 Drawing Sheets

HYDROGEN ABSORBING ALLOY AND METHOD FOR ITS PRODUCTION

CROSS REFERENCE TO RELATED APPLICATION

This is the 35 USC 371 national stage of international application PCT/JP01/03083 filed on Apr. 10, 2001, which designated the United States of America.

TECHNICAL FIELD

The present invention relates to a hydrogen storage material and a process for producing the same. More particularly, it relates to a hydrogen storage material which is capable of electrochemically and reversibly storing and releasing hydrogen and shows reduced variations in storage characteristics and service life characteristics, which are important battery characteristics, and also exhibits excellent charge and discharge characteristics and a process for producing the same.

BACKGROUND ART

A hydrogen storage material used in a nickel metal hydride battery is used in the form of a hydrogen storage electrode which is generally prepared by packing a powdered hydrogen storage material, if desired in combination with a binder and a conductive agent, into a three-dimensional porous substrate or applying it to a two-dimensional substrate.

Hydrogen storage materials that are commonly and widely used in this type of electrodes are of hexagonal crystal form represented by $MmNi_5$. These alloys usually have their alloying composition designed to secure characteristics required of electrodes, such as charge and discharge characteristics, storage characteristics, and service life characteristics. For example, the alloys have a high Co content, whereas alloy compositions with a reduced Co content have also been proposed (see JP-A-7-99055 and JP-A-9-213319). It has also been suggested to reduce the amount of Mn and Al dissolved out per specific surface area (see JP-A-11-96999).

With an alloy composition being fixed, however, stable battery characteristics cannot be maintained if the alloy structure varies. Hence it has been proposed to specify casting conditions or heat treating conditions in alloy production (see JP-A-11-152533 and JP-A-2000-234133). These manipulations alone nevertheless have difficulty in obtaining quite the same alloy structure, failing to stabilize the initial activity or discharge characteristics, particularly to completely suppress variations in storage characteristics and life characteristics.

In order to improve homogeneity of alloys thereby to improve characteristics, it has been proposed to atomize an alloy with a high-pressure inert gas or to feed a molten metal on the running surface of a rotating disk to finely scatter and solidify the molten metal to obtain spherical powder, or to drop a molten metal on a single roll rotating at a high speed to obtain a quenched thin ribbon. However, a large quantity of an inert gas which is expensive is required for obtaining a homogeneous hydrogen storage material powder. Moreover, the resulting spherical powder shows isotropic crystal orientation so that it suffers noticeable grain size reduction with repetition of hydrogen absorption and desorption.

On the other hand, in order to obtain a sufficient cooling rate in making a quenched thin ribbon, it is necessary to rotate the roll at a high speed. In this case, the solidified alloy obtained is as thin as 20 to 50 $\mu$m and is inconvenient to handle in a subsequent heat treatment or grinding. Besides, because the solidification by cooling is unidirectional, the crystals are highly orientated only to have poor initial activity. The method has an additional problem of low productivity because the amount of the molten metal that can be dropped is limited considerably.

The orientation in an alloy could be controlled by reducing the cooling rate, which results in impairment of the alloy structure homogeneity.

The hydrogen storage materials heretofore proposed have thus encountered with difficulty in securing a service life and storage characteristics of the alloy in consistence with discharge characteristics.

Accordingly, an object of the present invention is to provide a hydrogen storage material which shows reduced variations in storage characteristics and life and yet exhibits excellent initial activity and charge and discharge characteristics and to provide a process of producing the same.

SUMMARY OF THE INVENTION

The above object of the present invention is accomplished by the following hydrogen storage material and the following process of producing the same.

The present invention provides a hydrogen storage material which is characterized by having, as a cast alloy, a flaky or similar shape with a thickness of 50 to 500 $\mu$m and showing such crystallite orientation that the X-ray diffraction pattern has an intensity ratio of plane indices (002)/(200) of 2 to 10 as measured with the cooled surface of the flaky cast alloy being in parallel with a mount.

The present invention also provides a process for producing a hydrogen storage material as a preferred process for producing the hydrogen storage material of the present invention, which process is characterized by comprising dropping a molten metal in between at least two rotating rolls to make the molten metal fly three times or more between two of the rolls to rapidly solidify the molten metal by cooling.

BEST MODE FOR CARRYING OUT THE INVENTION

Figure 1:
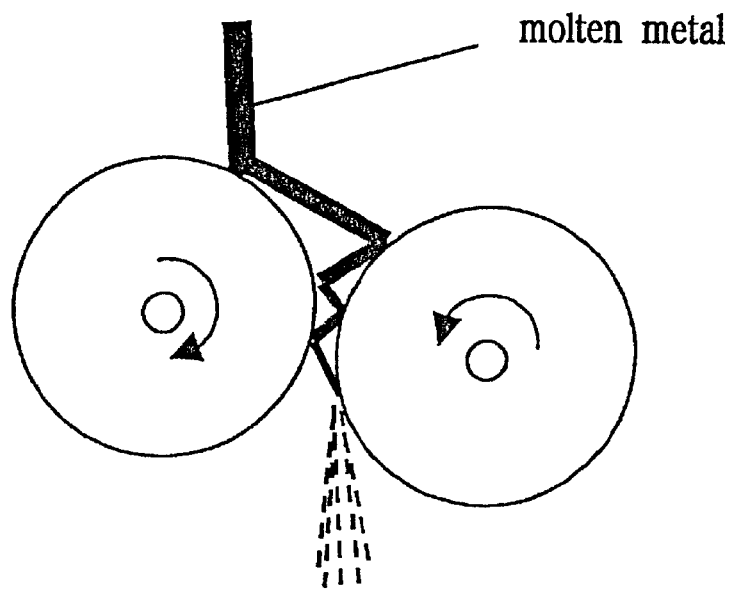
FIG. 1 illustrates the state of a hydrogen storage material being cast in Examples 1 to 5 and Comparative Examples 1 and 2.

Embodiments in carrying out the present invention will be described hereunder.

The hydrogen storage material according to the present invention is a cast alloy. It has a flaky shape or a similar shape. If the shape is spherical, the grain size retention in hydrogen absorption and desorption will be reduced. If it has an ingot shape or any other shape, Mn is hardly distributed uniformly in the structure, resulting in reduced anticorrosion characteristics.

The hydrogen storage material of the present invention has a thickness of 50 to 500 µm, preferably 50 to 200 µm. If the thickness is smaller than 50 µm, the structure, while homogeneous, exhibits appreciable crystal orientation, resulting in reduced initial activity or discharge characteristics. If it exceeds 500 µm, it will be difficult to eliminate segregation chiefly of Mn from the structure, and corrosion during storage or reduction in battery life can result.

Orientation of crystallites observed in the present invention is suppressed as compared with a product prepared by a general roll casting method, etc. Because the hydrogen storage material of the present invention is solidified while flying in a zig-zag between at least two rotating rolls, the directions of the surfaces to be cooled are not regular. As a result, the probability of hexagonal crystals having the same a-axis and the same c-axis is relatively low. Such a hydrogen storage material is characterized by superiority in initial electrode activity and discharge characteristics and also in resistance against grain size reduction.

It is desirable for the hydrogen storage material of the present invention in a non-heat-treated state to have a primary crystal grain size of 20 µm or smaller. Where the primary crystal grains have a size exceeding 20 µm, a heat treatment, if conducted for homogenization, fails to eliminate segregation mainly of Ni—Mn, and it is difficult to make the whole structure homogeneous.

The process of producing a hydrogen storage material according to the present invention will be explained below.

The process of producing a hydrogen storage material according to the present invention comprises dropping a molten metal in between at least two rotating rolls to make the molten metal fly three times or more between two of the rolls to rapidly solidify the molten metal by cooling.

The rolls which can be used in the process include two Cu-made rolls. The molten metal is made to fly three times or more, preferably 4 or 5 times, between rolls for rapid solidification by cooling. Where the number of flights between rolls for rapid solidification by cooling is two or less, the number of rotation of the rolls must be increased to reduce the thickness, which results in regular crystal orientation. If the thickness is increased enough to nonorientate the crystals, it would be difficult to uniformly distribute Mn, resulting in impairment of the characteristics.

In this way, even when a relatively large amount of a molten metal is cast, not only can the cooling rate be set sufficiently high but it is possible to control the thickness because the molten metal is cooled from both sides several times while flying in a zigzag between the rolls. The process of the present invention thus achieves remarkably high efficiency in high-volume production and has a high industrial value.

According to the process of the present invention, it is desirable for some compositions that the rapid solidification by cooling be followed by a heat treatment to reduce compositional fluctuation in the structure or to relax the casting strain. Seeing that fine grain boundary segregations mainly of Mn are found particularly in hydrogen storage materials of $MmNi_5$ type that are generally used, they are homogenized by a heat treatment. A heat treatment for the hydrogen storage material obtained by the process of the present invention completes in an extremely short time as compared with that for alloys obtained by ordinary casting using a mold. A heat treatment at 1050° C. or lower for 30 minutes or shorter is sufficient.

The hydrogen storage material according to the present invention is excellent not only in discharge characteristics but also in grain size retention against repetition of charges and discharges or hydrogen absorption and desorption. Further, being uniform in every site, it has markedly improved life and storage characteristics.

The present invention will now be illustrated in greater detail with reference to Examples.

EXAMPLES 1 TO 5

Comparative Examples 1 and 2

Raw materials of a hydrogen storage material, Mm (misch metal), Al, Mn, Co, Ni, and Cu, were weighed to make an alloy composition of $MmAl_{0.3}Mn_{0.45}Co_{0.4}Ni_{3.95}$ and mixed up. The mixture was put in a crucible, and the crucible was set in a high frequency melting furnace. After evacuating to a degree of vacuum of $10^{-4}$ to $10^{-5}$ Torr, the mixture was heat melted in an argon gas atmosphere. The molten metal was poured at 1500° C. in between two water-cooled rolls made of Cu which were disposed at a level difference as shown in FIG. 1 and rotated in reverse directions and made to fly while being cooled between the rolls. The number of revolution of the rolls, the pouring rate, and the number of collisions against the cooling surface are shown in Table 1. The resulting alloy was subjected to a heat treatment in an argon gas atmosphere under the conditions shown in Table 1 to obtain a flaky hydrogen storage material. The thickness of the resulting flaky hydrogen storage material is shown in Table 1.

Comparative Example 3

Figure 2:
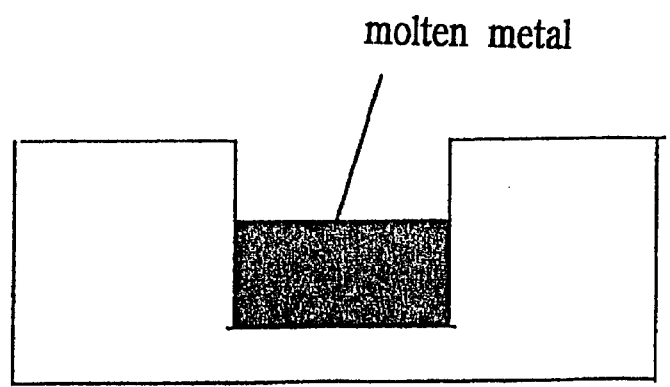
FIG. 2 illustrates the state of a hydrogen storage material being cast in Comparative Example 3.

Raw materials of a hydrogen storage material, Mm (misch metal), Al, Mn, Co, Ni, and Cu, were weighed to make an alloying composition of $MmAl_{0.3}Mn_{0.45}Co_{0.4}Ni_{3.95}$ and mixed up. The mixture was put in a crucible, and the crucible was set in a high frequency melting furnace. After evacuating to a degree of vacuum of $10^{-4}$ to $10^{-5}$ Torr, the mixture was heat melted in an argon gas atmosphere. The molten metal was cast at 1500° C. into a Cu-made water-cooled casting mold shown in FIG. 2. The rate of pouring is shown in Table 1. The resulting alloy was subjected to a heat treatment in an argon gas atmosphere under the conditions shown in Table 1 to obtain a hydrogen storage material ingot.

Comparative Example 4

Figure 3:
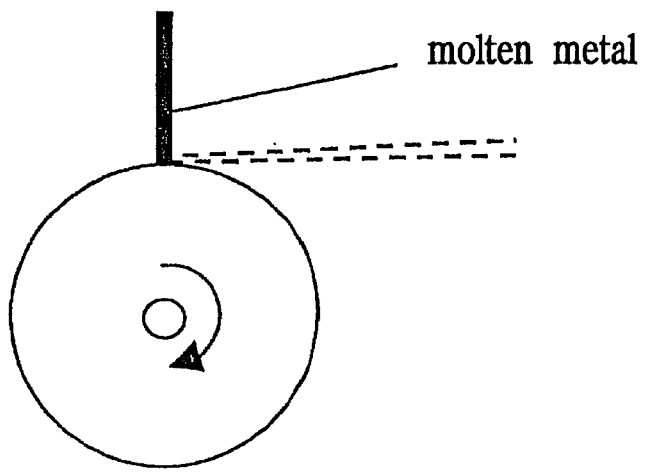
FIG. 3 shows the state of a hydrogen storage material being cast in Comparative Example 4.

Raw materials of a hydrogen storage material, Mm (misch metal), Al, Mn, Co, Ni, and Cu, were weighed to make an alloying composition of $MmAl_{0.3}Mn_{0.45}Co_{0.4}Ni_{3.95}$ and mixed up. The mixture was put in a crucible, and the crucible was set in a high frequency melting furnace. After evacuating to a degree of vacuum of $10^{-4}$ to $10^{-5}$ Torr, the mixture was heat melted in an argon gas atmosphere. The molten metal was poured at 1500° C. on a rotating water-cooled roll made of Cu shown in FIG. 3. and made to fly while being cooled. The number of revolution of the roll, the pouring rate, and the number of collisions against the cooling surface are shown in Table 1. The resulting alloy was subjected to a heat treatment in an argon gas atmosphere under the conditions shown in Table 1 to obtain a flaky hydrogen storage material. The thickness of the resulting flaky hydrogen storage material is shown in Table 1.

Comparative Example 5

Figure 4:
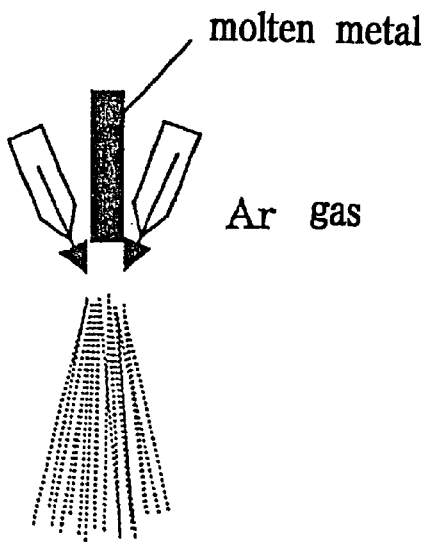
FIG. 4 shows the state of a hydrogen storage material being cast in Comparative Example 5.

Raw materials of a hydrogen storage material, Mm (misch metal), Al, Mn, Co, Ni, and Cu, were weighed to make an alloying composition of $MmAl_{0.3}Mn_{0.45}Co_{0.4}Ni_{3.95}$ and mixed up. The mixture was put in a crucible, and the crucible was set in a high frequency melting furnace. After evacuating to a degree of vacuum of $10^{-4}$ to $10^{-5}$ Torr, the mixture was heat melted in an argon gas atmosphere. The molten metal was atomized and cooled with high-pressure argon gas as shown in FIG. 4. The pouring rate of the molten metal is shown in Table 1. The resulting alloy was subjected to a heat treatment in an argon gas atmosphere under the conditions shown in Table 1 to obtain a spherical hydrogen storage material.

Evaluation of Characteristics:

The hydrogen storage materials obtained in Examples 1 to 5 and Comparative Examples 1 to 5 were evaluated for orientation, PCT capacity, grain size retention, initial capacity, electrode life, output characteristics, and anticorrosion in storage in accordance with the following methods. The results obtained are shown in Table 2.

1. Evaluation of Orientation

Figure 5:
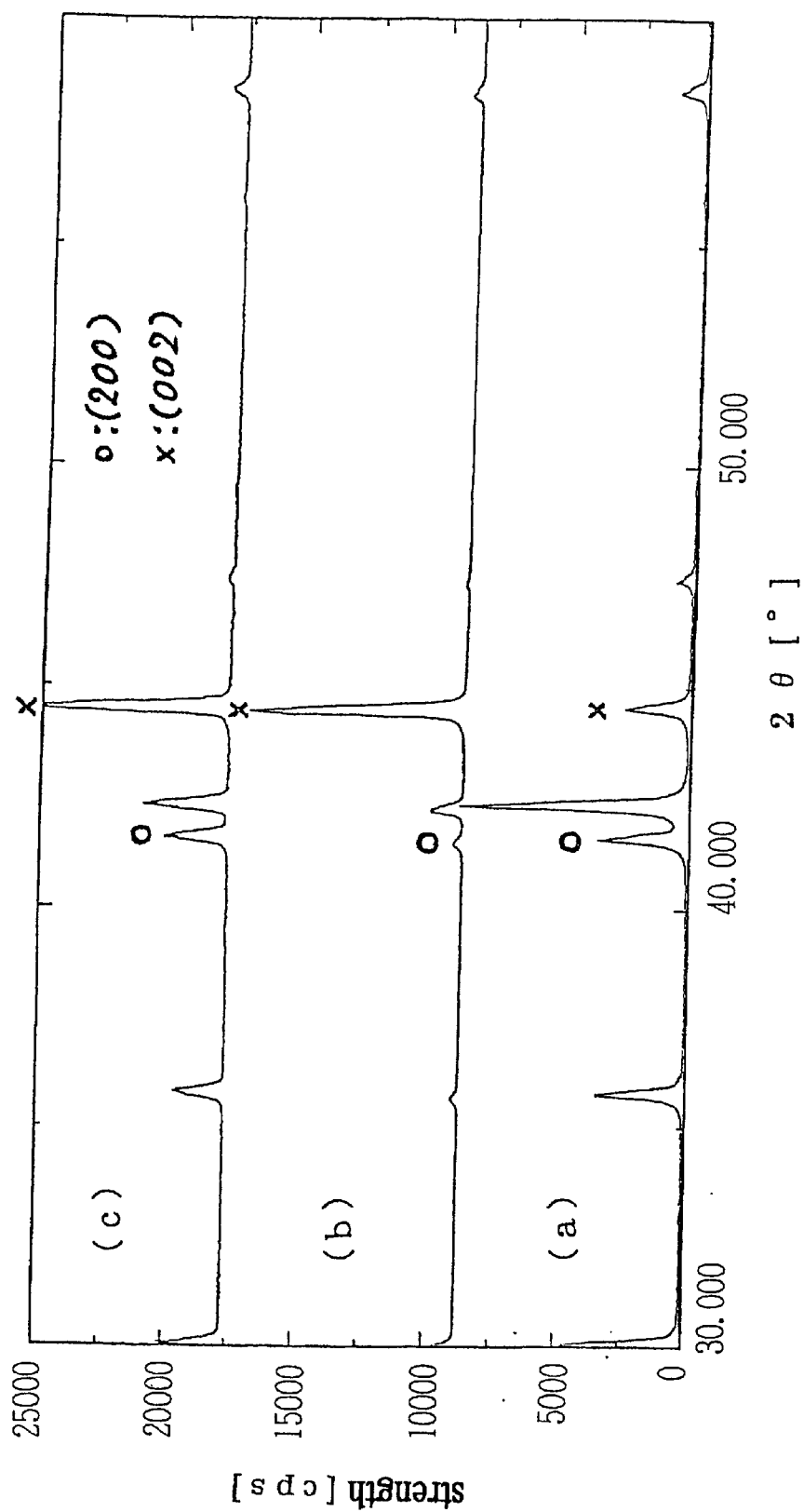
FIG. 5(a) presents a powder X-ray diffraction pattern of Comparative Example 3.
FIGS. 5(b) and 5(c) are X-ray diffraction patterns of the flaky cast alloys of Comparative Example 4 and Example 3, respectively, as measured with the cooled surface of the cast alloy being in parallel with a mount.
Figure 6:
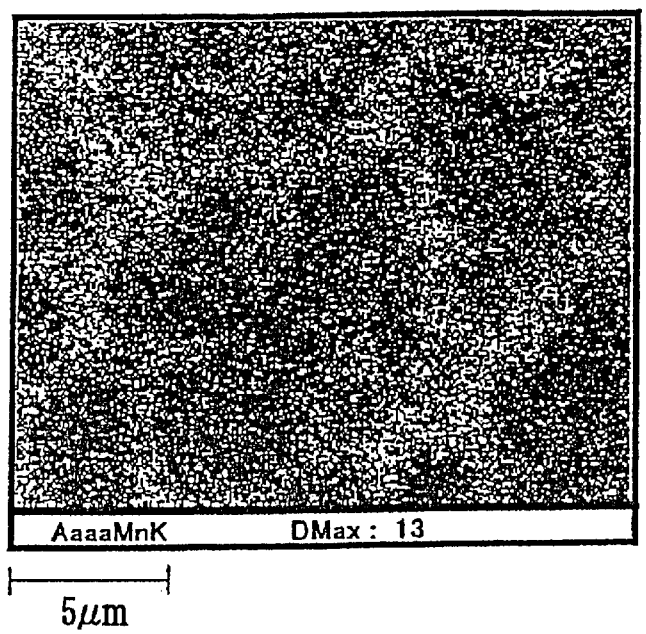
FIG. 6 is a characteristic X-ray diffraction pattern (5000 magnifications) of Mn on a cross-section of the hydrogen storage material of Example 3.
Figure 7:
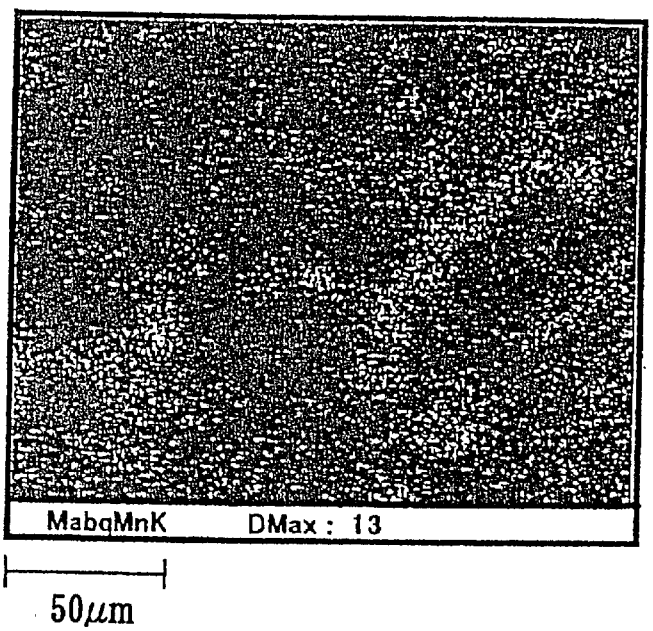
FIG. 7 is a characteristic X-ray diffraction pattern (500 magnifications) of Mn on a cross-section of the hydrogen storage material of Comparative Example 3.

The alloys of Examples 1 to 5 and Comparative Examples 1 to 5 as cast and heat-treated were subjected to X-ray diffractometry either on the cooled surface and after ground to 20 μm or smaller sizes. As a result, all the alloy systems had a hexagonal crystal structure of $CaCu_5$ type. The crystal orientation of the alloys prepared was evaluated from the diffraction peak intensity ratio of the (002) plane to the (200) plane, (002)/(200). In nature of powder X-ray diffractometry, the intensity ratio approaches that of a ground state according as the crystals become less orientated. Therefore, the higher the orientation index shown in the Table, the higher the degree of crystallite orientation. The powder X-ray diffraction pattern of Comparative Example 3 is shown in FIG. 5(a). The X-ray diffraction patterns of the flaky cast alloys of Comparative Example 4 and Example 3 as measured with the cooled side being in parallel with a mount are shown in FIGS. 5(b) and 5(c), respectively. The characteristic X-ray diffraction pattern (5000 magnifications) of Mn on a cross-section of the hydrogen storage material of Example 3 is shown in FIG. 6, and the characteristic X-ray diffraction pattern (500 magnifications) of Mn on a cross-section of the hydrogen storage material of Comparative Example 3 is shown in FIG. 7.

2. PCT Capacity

Calculated from the hydrogen absorption characteristics measured at 45° C. H/M:0 to 0.5 MPa 3. Grain Size Retention By use of a PCT apparatus, hydrogen gas of 30 bar was introduced into a hydrogen storage material having a grain size adjusted to 22 to 53 microns to make the hydrogen storage material absorb hydrogen, and then the hydrogen storage material was made to desorb hydrogen by evacuation. These treatments were repeated 10 times (cycle test). The grain size retention was obtained as a ratio of the average particle size after the cycle test to the average particle size before the cycle test.

Preparation of Electrode Cell:

A powdered hydrogen storage material having a grain size adjusted to 22 to 53 microns was mixed with prescribed amounts of a conductive agent and a binder. The mixed powder was pressed into a pellet electrode, which was used as an anode. The pellet anode was combined with a cathode having a sufficient capacity (sintered nickel hydroxide) with a separator interposed therebetween. The combined electrodes were dipped in a KOH aqueous solution having a specific gravity of 1.30 to prepare a model cell.

Setting of charge and discharge conditions:
 1) Initial activation test
    Charge: 0.2 C–130%; Discharge: 0.2 C–0.7 V (cut-off)
    Cycle: 15 cycles
    Temperature: 20° C.
 2) Output characteristics
    Charge: 0.2 C–130%; Discharge:1 C–0.7 V (cut-off)
    Temperature: 0° C.
 3) Life test
    Charge: 2 C/3–1h; Discharge: 2 C/3–1h
    Cycle: 100 cycles 4. Initial Capacity The discharge capacity in the first cycle in the above-described initial activation test.

5. Electrode Life

After the above-described life test, the cell was subjected to a charge at 0.2C–130% followed by a discharge at 0.2C–0.7 V cut-off to measure the discharge capacity. A ratio of the measured discharge capacity to the initial discharge capacity after the activation was evaluated as a capacity retention.

6. Output Characteristics

After the initial activation, a low-temperature and high-rate discharge capacity (0° C., 1C) was measured under the above-described conditions.

7. Corrosion in Storage (1) Total Corrosion

A corrosion behavior in storage was evaluated as follows. A classified hydrogen storage material powder was made to absorb hydrogen once for activation by use of a cell for PCT evaluation. The cell was put into an aqueous KOH solution having a specific gravity of 1.30 and left to stand as such at 80° C. for 4 hours to conduct a dissoultion test. The amount of the precipitate on the surface and the amount of dissolved alloy components were determined to give a total corrosion. The total corrosion was relatively expressed in terms of an index based on that of Comparative Example 3 taken as 100.

(2) VSM (vibration sample magnetometer) Value

After the determination of the total corrosion, the magnetization of the alloy under test attributed to Ni and Co on the alloy powder surface was measured with a VSM, which was evaluated as an indication of the degree of corrosion.

TABLE 1

| Number of Rotation of Roll (m/s) | Pouring Rate (kg/s) | Alloy Thickness (μm) | Number of Collisions | Heat Treating Conditions |
|---|---|---|---|---|
| Example | | | | |
| 1 | 5 | 1 | 300 | 3 | 1030° C./60 min |
| 2 | 10 | 1 | 150 | 4 | 1030° C./30 min |
| 3 | 15 | 2 | 100 | 5 | 1030° C./30 min |
| 4 | 20 | 2 | 80 | 5 | 1000° C./30 min |
| 5 | 25 | 2 | 60 | 5 | 1030° C./5 min |
| Comparative Example | | | | |
| 1 | 5 | 3 | 2000 | 2 | 1030° C./60 min |
| 2 | 25 | 0.5 | 30 | 1 | 1030° C./60 min |
| 3 | — | 2 | ingot | — | 1060° C./3 hr |
| 4 | 30 | 0.5 | 30 | 1 | 1030° C./60 min |
| 5 | — | 1 | sphere | — | 1030° C./60 min |

TABLE 2

| | Orientation (002)/(200) | | Alloy/Powder | PCT Capacity (H/M) | Grain Size Retention (D/%) | Initial Capacity (m Ah/g) | Electrode Life (vs. MM) | Output Characteristics (mAh/g) | Corrosion in Storage | |
|---|---|---|---|---|---|---|---|---|---|---|
| | Powder | Alloy | | | | | | | VSM | Total |
| Example | | | | | | | | | | |
| 1 | 0.79 | 1.79 | 2.3 | 0.81 | 91 | 85 | 96 | 220 | 1.72 | 75 |
| 2 | 0.82 | 2.78 | 3.4 | 0.82 | 93 | 80 | 98 | 220 | 1.73 | 68 |
| 3 | 0.74 | 3.12 | 4.2 | 0.80 | 94 | 80 | 99 | 200 | 1.65 | 55 |
| 4 | 0.81 | 3.57 | 4.4 | 0.82 | 97 | 85 | 98 | 215 | 1.55 | 52 |
| 5 | 0.84 | 3.70 | 4.4 | 0.80 | 96 | 70 | 98 | 200 | 1.50 | 50 |
| Comparative Example | | | | | | | | | | |
| 1 | 0.83 | 1.54 | 1.86 | 0.82 | 92 | 20 | 94 | 185 | 1.92 | 97 |
| 2 | 0.74 | 14.3 | 19.3 | 0.80 | 94 | 25 | 97 | 155 | 1.55 | 90 |
| 3 | 0.80 | 1.54 | 1.9 | 0.81 | 90 | 20 | 93 | 165 | 2.21 | 100 |
| 4 | 0.77 | 25 | 32.5 | 0.80 | 95 | 20 | 93 | 150 | 1.60 | 85 |
| 5 | 0.78 | 1.20 | 1.54 | 0.80 | 45 | 10 | 98 | 120 | 1.55 | 85 |

As is apparent from the results in Table 2, Examples show higher levels than Comparative Examples in grain size retention, battery output and electrode life in good balance. Examples are also proved superior to Comparative Examples in battery storage characteristics and life seeing from their generally lower magnetization after corrosion in storage and lower total corrosion.

Industrial Applicability:

As having been described, the hydrogen storage material according to the present invention has reduced variations in storage characteristics and life and yet exhibits excellent initial activity and charge and discharge characteristics. Further, the hydrogen storage material can be obtained with satisfactory productivity in high-volume production by the process of the present invention.

What is claimed is:

1. A hydrogen storage material having, as a cast alloy, a flaky shape with a thickness of 50 to 500 μm and showing such crystallite orientation that the X-ray diffraction pattern has an intensity ratio of plane indices (002)/(200) of 2 to 10 as measured with a cooled surface of the flaky cast alloy being in parallel with a mount.

2. The hydrogen storage material according to claim 1, which has a primary crystal grain size of 20 μm or smaller in a non-heat-treated state.

3. A process for producing a hydrogen storage material which comprises dropping a molten metal in between at least two rotating rolls to make said molten metal strike the rolls a total of three times or more to rapidly solidify said molten metal by cooling.

4. The process for producing a hydrogen storage material according to claim 3, wherein the rapidly solidified alloy is heat-treated at 1050° C. or lower for 60 minutes or shorter, and then rapidly cooled.

* * * * *